US008793011B2

(12) United States Patent
Schneider et al.

(10) Patent No.: US 8,793,011 B2
(45) Date of Patent: Jul. 29, 2014

(54) SYSTEM FOR THE AUTOMATIC DETECTION OF LOAD CYCLES OF A MACHINE FOR THE TRANSFERRING OF LOADS

(75) Inventors: Klaus Schneider, Hergatz (DE); Jürgen Sonderegger, Feldkirch (AT); Martin Amann, Frastanz (AT); Mathias Schneller, Bludenz (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 876 days.

(21) Appl. No.: 12/882,738

(22) Filed: Sep. 15, 2010

(65) Prior Publication Data

US 2011/0062104 A1 Mar. 17, 2011

(30) Foreign Application Priority Data

Sep. 16, 2009 (DE) ......................... 10 2009 041 661

(51) Int. Cl.
*G06F 7/00* (2006.01)

(52) U.S. Cl.
USPC ............ 700/213; 701/50; 414/140.3; 702/41; 73/865.9

(58) Field of Classification Search
USPC ........................................................ 700/213
See application file for complete search history.

(56) References Cited

U.S. PATENT DOCUMENTS

| | | | | |
|---|---|---|---|---|
| 5,245,137 | A * | 9/1993 | Bowman et al. | 177/139 |
| 5,359,516 | A * | 10/1994 | Anderson | 701/50 |
| 5,731,974 | A | 3/1998 | Pietzsch et al. | |
| 6,587,795 | B2 | 7/2003 | Schmid | |
| 6,962,091 | B2 * | 11/2005 | Lukas | 73/865.9 |
| 2004/0083025 | A1 * | 4/2004 | Yamanouchi et al. | 700/213 |
| 2005/0278101 | A1 * | 12/2005 | Lueschow et al. | 701/50 |
| 2006/0045661 | A1 * | 3/2006 | Andersson | 414/140.3 |
| 2007/0260380 | A1 * | 11/2007 | Mintah et al. | 701/50 |
| 2010/0131158 | A1 * | 5/2010 | Saito | 701/50 |
| 2011/0196623 | A1 * | 8/2011 | Hakkinen | 702/41 |

FOREIGN PATENT DOCUMENTS

| | | | |
|---|---|---|---|
| DE | 29503416 | | 7/1995 |
| DE | 19538264 | | 4/1997 |
| DE | 10023418 | | 11/2001 |
| DE | 60100577 | | 6/2004 |
| EP | 1150019 | A1 | 10/2001 |
| EP | 1103511 | A2 | 9/2013 |

* cited by examiner

*Primary Examiner* — Gene Crawford
*Assistant Examiner* — Kyle Logan
(74) *Attorney, Agent, or Firm* — Dilworth & Barrese, LLP

(57) ABSTRACT

The present invention relates to a system for the automatic detection of load cycles of a machine for the transferring of loads, wherein the machine includes a lifting apparatus for the raising of the load and a transport apparatus for the horizontal movement of the load, comprising: a load change detection for the automatic detection of a load change at least on the basis of the output signals of a lifting force measurement apparatus, a load position detection which detects the position of the load in at least a horizontal direction and a load cycle detection for the automatic detection of a load cycle, wherein the load cycle detection takes place at least on the basis of the output signals of the load change detection and of the load position detection. In accordance with the invention, the load cycle detection stores the position of the load as the load pick-up point when a positive load change was recognized and evaluates the positive load change as the start of a new load cycle on the basis of a query as to whether the load has been moved a predetermined distance from the load pick-up point in the horizontal.

20 Claims, 12 Drawing Sheets

SYSTEM FOR THE AUTOMATIC DETECTION OF LOAD CYCLES OF A MACHINE FOR THE TRANSFERRING OF LOADS

BACKGROUND OF THE INVENTION

The present invention relates to a system for the automatic detection of load cycles of a machine for the transferring of loads, wherein the machine includes a lifting apparatus for the raising of the load and a transport apparatus for the horizontal movement of the load. The transport apparatus can in this respect in particular be the slewing gear and/or the luffing mechanism of a crane.

The system in this respect includes a load change detection for the automatic detection of a load change at least on the basis of the output signals of a lifting force measurement apparatus, a load position detection which detects the position of the load in at least a horizontal direction and a load cycle detection for the automatic detection of a load cycle, wherein the load cycle detection takes place at least on the basis of the output signals of the load change detection and of the load position detection.

Systems are known in this respect from the prior art for the detection of the load cycles of transfer cranes in which the start and the end of a cycle is detected on the exceeding or the falling below of a fixed load threshold via a tared weight of the load suspension means. The crane operator furthermore has to input a trigger threshold, with the load mass being detected and being defined as a load weight of the load cycle when said trigger threshold is crossed. A slew angle of the crane is in this respect used as the trigger threshold.

The known systems in this respect have a plurality of problems which are in particular founded in the necessity of a manual interaction by the crane operator. The trigger threshold or the slew angle is thus often not set or is set at an incorrect position so that no recording or a falsified recording takes place. In addition, very high load thresholds are used for the determination of the start point and of the stop point of the cycle to avoid an incorrect detection of load cycles. Since the weight of the payload is, however, often frequently lower than the weight of the load suspension means and of the sling gear and is lower by an order of magnitude than the maximum load, a reliable detection of load cycles can thus not be ensured. In addition, the measurement system has to be configured very exactly.

Further problems result from the manual taring of the weight of the load suspension means and of the sling gear which in particular represents a frequent error source on the exchange of the load suspension means.

SUMMARY OF THE INVENTION

It is therefore the object of the present invention to provide a system for the automatic detection of load cycles of a machine for the transferring of loads which manages with less interaction, and where possible without any manual interaction, and nevertheless recognizes load cycles and/or the weight of the load suspension means with high reliability.

This object is achieved in accordance with the invention by a system in accordance with the description herein.

The present invention in this respect comprises a system for the automatic detection of load cycles of a machine for the transferring of loads, wherein the machine includes a lifting apparatus for the raising of the load and a transport apparatus for the horizontal movement of the load.

The system in accordance with the invention can be used e.g. on a crane. The lifting apparatus can then e.g. be the lifting mechanism of the crane; the transport apparatus can e.g. be the slewing gear and/or the luffing mechanism of the crane. The load suspended at the crane rope can be raised and lowered by moving the lifting mechanism. The load can be moved in at least one horizontal direction by slewing and/or luffing the boom of the crane up and down.

The system in accordance with the invention can, however, not only be used with a crane, but also with other transfer machines, in particular with construction machinery, transport units, industrial trucks, reach stackers and/or wheeled loaders. All these units have a lifting apparatus via which a load can be raised and lowered again as well as a transport apparatus for the horizontal movement of the load.

The system in accordance with the invention in this respect includes a load change detection for the automatic detection of a load change at least on the basis of the output signals of a lifting force measurement apparatus, a load position detection which detects the position of the load in at least a horizontal direction and a load cycle detection for the automatic detection of a load cycle, wherein the load cycle detection takes place at least on the basis of the output signals of the load change detection and of the load position detection. Provision is made in accordance with the invention in this respect that the load cycle detection detects and stores the position of the load as a load pick-up point when a positive load change was recognized. Such a positive load change is then evaluated as the start of a new load cycle on the basis of a query whether the load was moved a predetermined distance from the load pick-up point in the horizontal.

The system in accordance with the invention in this respect advantageously only detects a positive load change as the start of a new load cycle when the load was moved a predetermined distance from the load pick-up point in the horizontal after detection of the positive load change. It is hereby avoided that a new load cycle is detected every time on the multiple raising and lowering of the load at the load pick-up point, which can take place, for example, for the better positioning of a load suspension apparatus. The system in accordance with the invention hereby becomes much more reliable with respect to the detection of the load cycle. It is furthermore no longer necessary to preset a trigger threshold manually. A reliable criterion for the reliable recognition of a new load cycle is rather given by the comparison of the then current position of the load with the stored load pick-up point and the query whether the load was moved a predetermined distance from the load pick-up point in the horizontal.

The trigger threshold for the confirmation of a load cycle is thus generated automatically in the present invention and in dependence on the respective load pick-up point. The predetermined distance from the load pick-up point can in this respect be a fixed distance, for example, by which the load is moved away from the load pick-up point. It can in this respect, for example, be a distance of three meters. The distance should in this respect in particular be larger than the distance usually necessary for the exact positioning of the load.

The load position detection can in this respect determine the position of the load, for example, with reference to the machine coordinates; with a crane, for example, with reference to the slew angle and the luffing angle of the boom. The position and/or movement of the load or of the load suspension means is in this respect advantageously determined via the position and/or speed of the boom tip. In this respect, the position and/or movement of the load and/or of the load suspension means (which is only required in the horizontal direction) corresponds to the position and/or speed of the boom tip.

The system in accordance with the invention furthermore advantageously has a load speed detection which detects the speed of the load at least in the horizontal direction, with the load cycle detection furthermore taking place on the basis of the output signals of the load speed detection. The load speed detection can in this respect advantageously in turn take place on the basis of machine coordinates, in particular on the basis of the slew angle and/or of the luffing angle or of the slew speed and of the luffing speed of the crane. The recognition of a load cycle is improved even further by the use of the load speed for the detection of a load cycle. It can in particular thereby be prevented that a new load cycle is erroneously recognized on fluctuations in the output signal of the lifting force measurement apparatus occurring due to the dynamics of the load system.

The load cycle detection in this respect advantageously evaluates a positive load change as the start of a new load cycle on the basis of a query whether the load speed has not exceeded a predetermined value during the positive load change. In this respect, a positive load change is advantageously only evaluated as a start of a new load cycle when the load speed does not exceed the predetermined value during the positive load change.

High oscillation in the output signals of the lifting force measurement apparatus can in this respect, for example, occur due to oscillations of the load during the horizontal movement of the load. Such fluctuations are, however, not evaluated as the start of a new load cycle by the system in accordance with the invention since the speed of the load in the horizontal direction usually exceeds the predetermined value at the time of this load fluctuation. At the start of a real load cycle, the load suspension means is, in contrast, usually not moved, or is hardly moved, in the horizontal direction since it has to be aligned with respect to the load. The load speed thus provides a good criterion to eliminate load changes which do not correspond to the start of a new load cycle.

Further advantageously, provision is made in the system in accordance with the invention that the load cycle detection determines the end of an active load cycle on the basis of a query whether a negative load change is taking place. The system in accordance with the invention advantageously only evaluates a negative load change as the end of an active load cycle when the start of a new load cycle is thereupon recognized. If, in contrast, a negative load change is followed by a positive load change which is not evaluated as the start of a new load cycle because the load speed exceeds a predetermined value during the positive load change, the negative load change is likewise not evaluated as the end of an active load cycle.

It can hereby be prevented that load fluctuations during the movement of the load are erroneously evaluated as the end of an active load cycle. Since it is, however, absolutely possible that the load suspension means is still moving during the unloading of the load, for example when a bulk material is distributed over a certain distance by means of a grab, no criterion with respect to the speed of the load is provided for a negative load change. Whether a negative load change is evaluated as the end of an active load cycle thus solely depends on how the subsequent positive load change is evaluated.

Provision is advantageously made in the system in accordance with the invention that the load cycle detection takes place on the basis of a discrete state machine. Such a discrete state machine allows a simple realization of the load cycle detection in accordance with the invention.

The discrete state machine in this respect advantageously has at least the following states: No load; positive load change recognized; active load cycle confirmed. In this respect, the state machine is first located in the no load state. In this state, the measured signal generated by the lifting force measurement apparatus is used for the determination of the mass of the load suspension means. If a positive load change is now recognized, the system switches into the state of positive load change recognized. At the same time, the position of the load on the positive load change is stored as the load pick-up point. If the load was now moved by a predetermined distance from the load pick-up point in the horizontal after the positive load change, the state machine switches into the state of active load cycle confirmed. The start of a new load cycle is thus recognized. In the state of active load cycle confirmed, the mass is now, for example, determined on the basis of the signals of the lifting force measurement apparatus.

If the state machine is, in contrast, in the state of positive load change recognized and a negative load change follows, the state machine changes back again into the state of no load without an active load cycle having been detected. If the state machine is, in contrast, in the state of active load cycle confirmed and a negative load change follows, the state machine switches into the state of no load, whereby the end of the active load cycle is detected. In this respect, the data on the ended load cycle are advantageously stored in a memory unit such as a database.

If it is also queried whether the load speed is below a predetermined value on the recognition of a positive load change, the state machine is modified as follows: The state machine switches from the state of no load into the state of positive load change recognized when a positive load change takes place and the speed is below the predetermined value. If, in contrast, a positive load change takes place at a load speed which is above the predetermined value, the machine switches from the state of no load directly into the state of active load cycle confirmed. If a negative load change now takes place in the state of active load cycle confirmed, the state machine switches into the state of no load. This is, however, only evaluated as the end of an active load cycle when the state machine thereupon switches into the state of positive load change recognized. If, in contrast, the state machine switches directly into the state of active load cycle confirmed, a continuing active load cycle is assumed. In this respect, for example, a high-ranking selection logic can be used for the evaluation of when the start and when the end of an active load cycle is present.

In the system in accordance with the invention, provision is furthermore advantageously made that the load cycle detection detects the load weight on the basis of the output signals of the lifting force measurement apparatus, in particular by calculating an average over the active load cycle or over a part range of the active load cycle. The automatic load cycle recognition is thus used for the purpose of determining the load weight for each active load cycle.

The system in accordance with the invention furthermore advantageously includes a load suspension means detection unit which automatically detects the weight of the load suspension means. A manual taring of the system can hereby be omitted. The automatic detection of the weight of the load suspension means in this respect advantageously takes place on the basis of the discrete state machine. If a state machine is used such as has been described above, the determination of the weight of the load suspension means advantageously takes place in the state of no load.

The weight of the load suspension means is in this respect advantageously determined by calculating an average, with phases in which the output signal of the lifting force measurement apparatus falls below a specific limit value beneath the previously determined weight of the load suspension means not being taken into account. It can hereby be prevented that a decrease of the output signal of the lifting force measurement apparatus falsifies the determination of the weight of the load suspension means on the placing of the suspension means onto the load.

A positive load change is in this respect advantageously detected by the load change detection when the output signal of the lifting force measurement apparatus exceeds the weight of the load suspension means by a preset value. A negative load change is in contrast advantageously recognized when the output signal of the lifting force measurement apparatus again approaches the weight of the load suspension means up to the preset value.

The present invention furthermore includes a system for the automatic detection of exchange of the load suspension means in a machine for the transferring of loads, particularly in a crane, wherein the machine includes a lifting apparatus for the raising of the load. The system in this respect includes a lifting force measurement apparatus for the measurement of the lifting force and a load suspension means detection unit which automatically recognizes a change of the load suspension means at least on the basis of the output signals of the lifting force measurement apparatus.

The present invention thus makes it possible automatically to recognize and take account of a change of the load suspension means and thus a change in the weight of the load suspension means. In this respect, a separate signal transducer at the load suspension means is not necessary, since the detection takes place at least on the basis of the output signals of the lifting force measurement apparatus.

The system in this respect advantageously includes a position detection which detects the position of the load suspension means in at least a horizontal direction, with the load suspension means detection unit automatically recognizing a change of the load suspension means at least on the basis of the output signals of the lifting force measurement apparatus and on the basis of the position detection.

The system further advantageously includes a load change detection for the automatic detection of a load change at least on the basis of the output signals of the lifting force measurement apparatus, wherein the load suspension means detection unit recognizes a change of the load suspension means on the basis of the load change detected by the load change detection.

The load suspension means detection unit in this respect advantageously always stores the position of the load suspension means when a load change has taken place. The determination whether such a load change corresponds to a change of the load suspension means advantageously then takes place at least on the basis of a query of the distance of the load suspension means from this stored position in the horizontal direction.

The system further advantageously includes a load cycle detection for the automatic detection of a load cycle, wherein the load suspension means detection unit works on the basis of the load cycle detection.

The detection of a change of the load suspension means in this respect advantageously takes place on the basis of a load cycle detection such as was presented above. The system in accordance with the invention for the automatic detection of changes of the load suspension means is, however, obviously also of great advantage independently of the system in accordance with the invention for the automatic detection of load cycles.

In this respect, a change of the load suspension means is advantageously detected with reference to one or more discrete state machines. This makes it possible in this respect reliable to recognize the change of a load suspension means even if only the output signal of the lifting force measurement apparatus and the machine coordinates are used.

Provision is further advantageously made that the load suspension means detection takes place on the basis of a load cycle detection and stores the position of the load suspension means when a negative load change has taken place while no active load cycle is present. In this respect, such a negative load change while no active load cycle is detected is evaluated as a change to a lighter load suspension means on the basis of a query as to whether the load suspension means was moved a predetermined distance from the stored position in the horizontal after the negative load change. A negative load change in a state in which no active load cycle is present is recognized in this respect when the output signal of the lifting force measurement apparatus falls below the previously detected weight of the load suspension means by a predetermined amount.

If therefore the load suspension means or the machine for the transferring of loads is moved by a predetermined distance in the horizontal after a negative load change without the output signal of the lifting force measurement apparatus having again returned in the range of the previously detected weight of the load suspension means or having exceeded this range, this is evaluated as a change to a lighter load suspension means. The detected weight of the load suspension means is thereupon updated.

If the load suspension means detection is realized via a state machine, it changes from the state of no load into a state of negative load change when a negative load change takes place, that is, when the output signal of the lifting force measurement apparatus falls below the previously detected weight of the load suspension means by a specific value. A check is made in this state whether the load suspension means or the machine for the transferring of the load is moved in the horizontal direction. If this movement exceeds a specific predetermined value, for example six meters, this is evaluated as a change to a lighter load suspension means. The state machine then again switches back into the state of no load, with the detected weight of the load suspension means being updated.

If, in contrast, a positive load change is detected, the state machine again changes into the state of no load without the detected weight of the load suspension means having been updated. A positive load change is in this respect recognized in this state when the output signal of the lifting force measurement apparatus again increases above a predetermined value below the detected weight of the load suspension means.

Provision is further advantageously made in accordance with the invention that the load suspension means detection unit detects a change of the load suspension means on the basis of a plurality of discrete state machines which run in parallel and whose states are checked by a higher-ranking control logic. The change to a heavier load suspension means can thus in particular be recognized. In this respect, whenever a first state machine confirms an active load cycles a second state machine is advantageously started. This second state machine in this respect starts in the state of no load and thus detects the correspondingly higher weight as the weight of the load suspension means.

The higher-ranking control logic in this respect decides which of the state machines running in parallel actually detects the correct active load cycle and which of the state machines has to be deleted again. The control logic in particular always decides this when one of the state machines recognizes the end of an active load cycle.

Provision is advantageously made in this respect that for the case that a first state machine recognizes the end of an active load cycle, a predetermined time is first waited whether further state machines recognize the end of an active load cycle. If this is not the case, the first state machine is evaluated as the state machine which gives the correct load cycle.

If, in contrast, further state machines signalize that its active load cycle was ended, the decision takes place via a further criterion. For this purpose, the position at which the first state machine has recognized the end of the active load cycle is saved. A check is thereupon made as to which weight is measured at this time when the load suspension means has moved a predetermined distance away from this point in the horizontal direction, for example by three meters. The state machine is thereupon considered as the correct state machine whose detected weight of the load suspension means corresponds to the load weight currently determined at this point in time.

Provision is further advantageously made that the load cycle detection in accordance with the invention stores load cycle data on each detected load cycle in a database, wherein the database enables a later evaluation of the data. The system in accordance with the invention hereby enables a comprehensive and exact evaluation of the work routines on the transfer of the loads.

The load cycle data in this respect advantageously include one or more of the following data: Load weight, load cycle duration, start and stop position, start and stop time, weight of the load suspension means, minimal and maximum value of the load during the load cycle, travel distance, characteristics of the machine or of the drives of the machine. In this respect in particular a plurality of these data can be stored in the database.

The evaluation of the data advantageously includes a determination of one or more of the following data: Energy/fuel consumption, total weight of the transferred load, average transfer performance, power/performance indices. The evaluation of the data can take place directly in the system or alternatively by an additional device onto which the data from the database are transferred.

A variety of functionalities are hereby possible. For example, an accounting of the total transfer of the system in accordance with the invention can thus take place. The customer thus has the possibility, for example, to determine the total transfer on the transfer of bulk goods solely with reference to the data from the load cycle recognition in accordance with the invention.

The data of the load cycle recognition in accordance with the invention can furthermore be used to load a ship evenly. On the loading of bulk goods onto a ship, the payload per hold can be exactly determined by means of the load cycle recognition in accordance with the invention. An asymmetrical loading of the ship can hereby be avoided.

The data of the load cycle recognition can furthermore be used to demonstrate a specific guaranteed transfer performance. In addition, the possibility results of preparing performance indices, e.g. for individual crane operators.

In addition to the system for the automatic recognition of load cycles and the system for the automatic detection of the change of a load suspension means, such as have been described above, the present invention furthermore includes a transfer machine having one or both systems.

The transfer machine can in this respect e.g. be a crane, with the lifting apparatus corresponding to the lifting mechanism of the crane. The lifting force measurement apparatus is in this respect advantageously an apparatus for the measurement of the rope force in the hoist rope. If it is a slewing crane, the transport apparatus corresponds to the slewing gear and/or the luffing mechanism of the crane.

The transfer machine can, however, e.g. also be a reach stacker, a fork-lift truck, an excavator, a wheeled loader or any other desired transport machine having a lifting apparatus for the raising of a load. The systems in accordance with the invention can also be used without problem with this machinery since the load cycle detection and the load suspension means detection takes place independently of the specific design of the transfer machine solely on the basis of the force measurement and of the position determination.

The present invention furthermore comprises a method for the detection of load cycles of a machine for the transferring of loads, wherein the machine includes a lifting apparatus for the raising of the load and a transport apparatus for the horizontal movement of the load. The method in accordance with the invention in this respect includes the steps: determining the lifting force of the lifting apparatus; detecting a load change at least on the basis of the specific lifting force; detecting the position of the loads at least in the horizontal direction; automatically detecting a load cycle at least on the basis of a detected load change and of the position of the load. In this respect, the steps are furthermore provided in accordance with the invention: detecting the position of the load as the load pick-up point when a positive load change was recognized and evaluating the positive load change as the start of a new load cycle on the basis of a query whether the load was moved a predetermined distance from the load pick-up point in the horizontal.

The methods in accordance with the invention have the same advantages which have already been described in more detail above with respect to the systems in accordance with the invention. The methods in this respect furthermore advantageously run as was likewise presented further above with respect to the systems. The methods in this respect in particular advantageously take place by means of the systems such as have been presented above.

BRIEF DESCRIPTION OF THE DRAWINGS

The present invention will now be described in more detail with reference to an embodiment and to drawings. There are shown.

DESCRIPTION OF THE PREFERRED EMBODIMENTS

Figure 1:
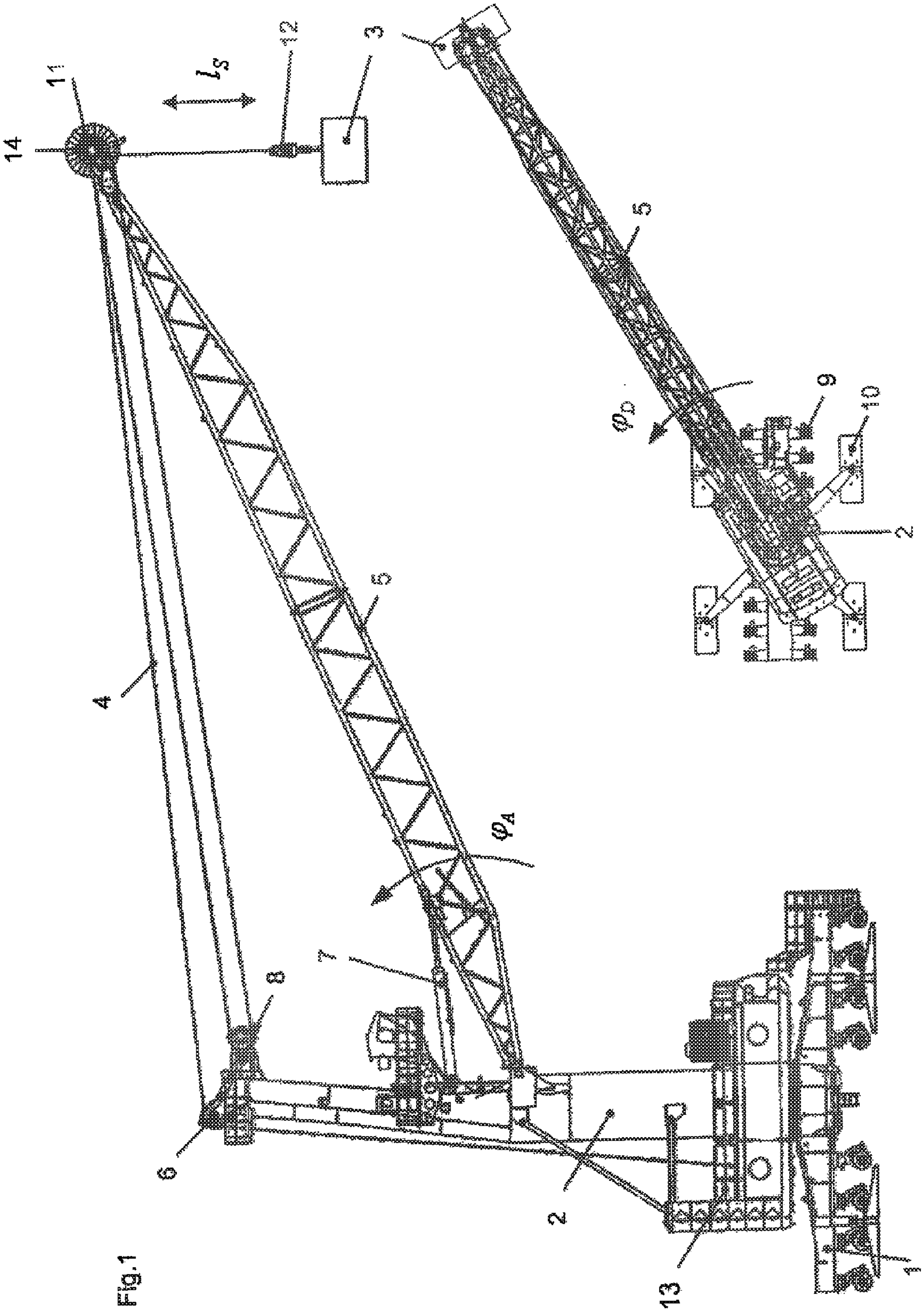
FIG. 1 an embodiment of a machine in accordance with the invention for the transferring of loads.

FIG. 1 shows an embodiment of a machine in accordance with the invention for the transferring of loads in which an embodiment of a system in accordance with the invention for the automatic detection of load cycles and an embodiment of a system in accordance with the invention for the detection of the change of a load suspension means are used. The machine for the transferring of loads in the embodiment is a crane, in particular a harbor mobile crane. The crane has an undercarriage 1 with a chassis 9. The crane can hereby be moved in the harbor. The crane can then be supported via support units 10 at the hoisting location. A tower 2 is arranged rotatably about a vertical axis of rotation on the undercarriage 1. A boom 5 is connected pivotally about a horizontal axis to the tower 2. The boom 5 can in this respect be pivoted upwardly and downwardly in the luffing plane via the hydraulic cylinder 7.

The crane in this respect has a hoist rope 4 which is led about a deflection pulley 11 at the tip of the boom. A load suspension means 12 with which a load 3 can be taken up is arranged at the end of the hoist rope 4. The load suspension means 12 or the load 3 are in this respect raised or lowered by moving the hoist rope 4. The changes of the position of the load suspension means 12 or of the load 3 in the vertical direction thus takes place by decreasing or increasing the length $l_S$ of the hoist rope 4. A winch 13 which moves the hoist rope is provided for this purpose. The winch 13 is in this respect arranged at the superstructure. The hoist rope 4 is furthermore first led from the winch 13 via a first deflection pulley 6 at the tip of the tower 2 to a deflection pulley 14 at the tip of the boom 5 and from there back to the tower 2 where it is led via a second deflection pulley 8 to a deflection pulley 11 at the boom tip from where the hoist rope runs down to the load 3.

The load suspension means 12 or the load can furthermore be moved in the horizontal by pivoting the tower 2 about the angle $\phi_D$ and by luffing the boom 5 up and down by the angle $\phi_A$. A lifting movement of the load 3 in addition to the movement of the load in the radial direction results on the luffing of the boom 5 up and down by the arrangement of the winch 13 at the superstructure. This must optionally be compensated by a corresponding control of the winch 13.

Figure 2:
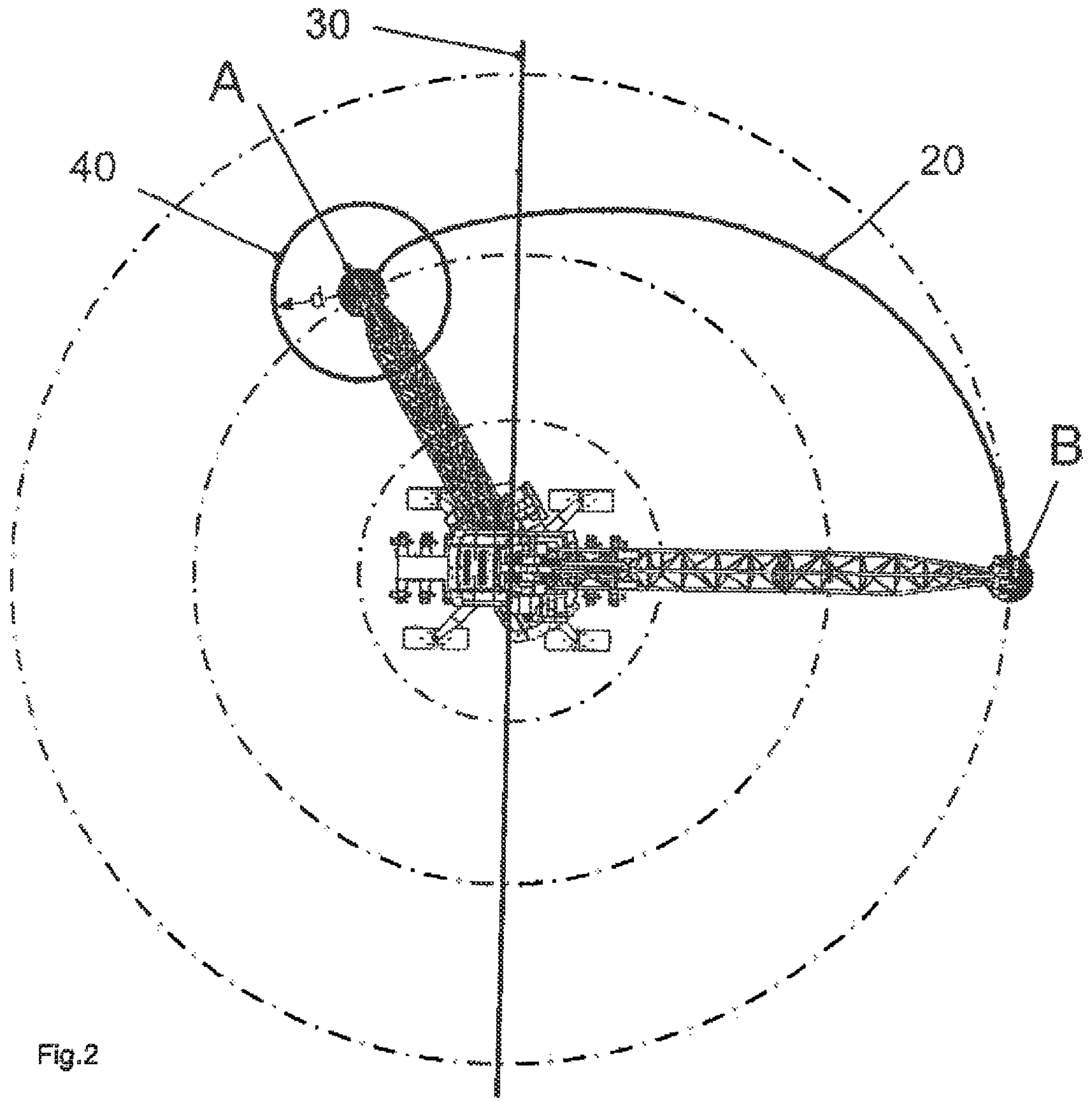
FIG. 2 a representation of a load cycle from a bird's eye view.

A typical transfer situation for the machine in accordance with the invention for the transferring of loads is now shown in FIG. 2. The load is in this respect raised at the point A, is moved in the horizontal along the path 20 and is then placed down again at the point B. Such a cycle of raising the load, moving the load in the horizontal direction and placing down the load in this respect describes a load cycle. The crane operator has to manually preset a trigger threshold 30 for the recognition of such a load cycle in accordance with the prior art. When this trigger threshold 30 is exceeded by the load, a new load cycle is counted and the then currently measured load mass for this load cycle is stored. A plurality of problems hereby resulted which have already been described in more detail above.

Provision is therefore made in accordance with the present invention that the system for the automatic detection of load cycles at the point A automatically recognizes that the load was raised. The load cycle detection now stores the position of the load as the load pick-up point A. The then current position of the load is thereupon continuously compared with this stored load pick-up point. The taking up of the load is only evaluated as a new load cycle when the load was moved a predetermined distance d from the load pick-up point in the horizontal after the taking up. Instead of the manual trigger threshold 30, an automatically generated trigger threshold 40 is thus provided in accordance with the present invention which is automatically placed around the detected load pick-up point.

The trigger threshold 40 is thus automatically generated in dependence on the detected load pick-up point on the taking up of a load. The load cycle detection is hereby considerably more reliable and can moreover be carried out completely automatically and without any interaction by the crane operator.

The picking up of a load is in this respect automatically detected by a load change detection. The load change detection works on the basis of the output signals of a lifting force measurement apparatus. This lifting force measurement apparatus can, for example, be arranged in the pivotal connection of the winch 13 or in the pivotal connection of the deflection pulley 8. Alternatively, such a lifting force measurement apparatus can also be arranged in the area of the load suspension means 12. The arrangement of the lifting force measurement apparatus at the winch 13 or at the deflection pulley 8, however, has the advantage that no additional cabling has to be provided to the load suspension means. The lifting force measurement apparatus in this respect first measures the force which is present in the hoist rope 4 at the corresponding measurement position. The lifting force measurement device calculates the mass of the load suspension means 12 and of the suspended load 3 from this rope force.

In this respect, a compensation for the weight of the hoist rope 4 and for the friction losses at the deflection pulleys can take place. In addition, dynamic effects which arise by the acceleration of the load or by oscillations can be taken into account on the determination of the mass of the load suspension means 12 and of the load 3. The lifting force measurement apparatus then outputs the then currently measured load weight as the output signal, said load weight corresponding to the sum of the weight of the load suspension means 12 and of the load 3.

The load cycle detection first determines the weight of the load suspension means 12 as will be shown in more detail further below. The load change detection now detects a load change on the basis of the weight of the load suspension means 12 and of the then currently measured load weight. A positive load change is in this respect recognized in the embodiment when the then currently measured load weight exceeds the previously detected weight of the load suspension means 12 by a specific value T. In this respect, for example, a value of 0.8 t can be selected as the value T. A negative load change is, in contrast, recognized, when the load weight in turn falls below the limit value T above the previously determined weight of the load suspension means 12 after a positive load change. However, an automatic load cycle detection cannot be operated reliably solely on the basis of the signals of the load change detection since such load changes can, for example, take place on the setting down of the load when the load has to be lowered and raised again a plurality of times at the target location for the exact positioning, such as is often the case when containers have to be stacked on one another.

Figure 3A:
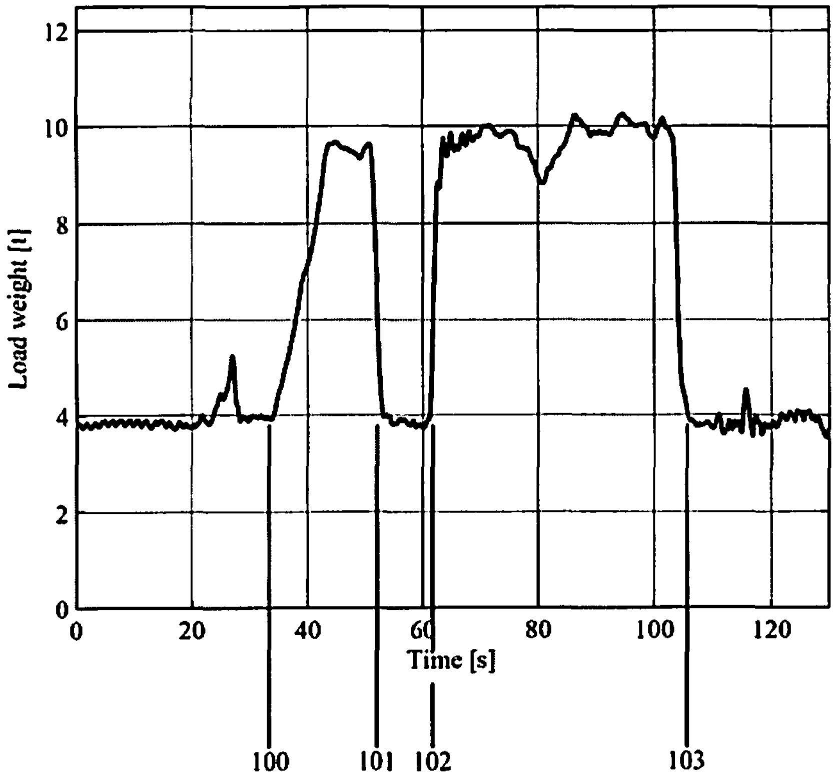
FIGS. 3*a* and 3*b* the load weight signal over a load cycle on the use of a load hook and of a spreader.

In addition, the signal of the lifting force measurement apparatus makes a distinction in dependence on the type of the lift or on the type of the load suspension means 12 used. Two typical curves of the output signal of the lifting force measurement apparatus are in this respect shown in FIGS. 3*a* and 3*b*. In FIG. 3*a*, a typical load weight signal on the use of a hook as a single load suspension means is shown. The hook itself in this respect has a mass of approximately 4 t. At the time 100, a load having a mass of approximately 6 t is suspended at the hook and is raised, is lowered again at the time 101, is taken up again at the time 102 and is finally placed down at the time 103. However, it cannot be recognized with reference to this load signal alone whether one load cycle or two load cycles or even no load cycle has/have actually taken place.

Figure 3B:
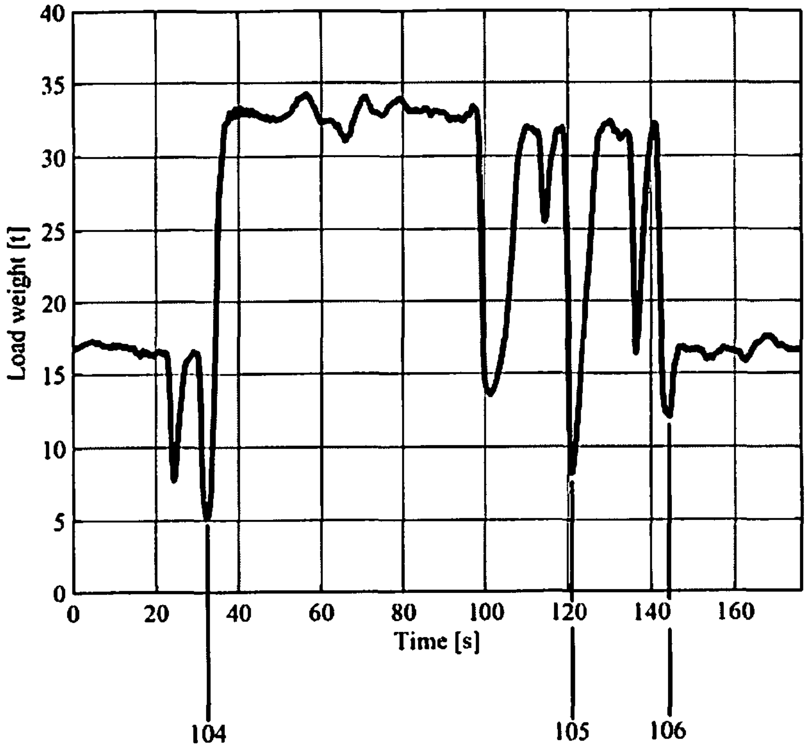

In FIG. 3*b*, a typical curve of a load weight signal is shown on the use of a spreader with which containers can be taken up and placed down. The spreader is in this respect suspended at the hook of the crane and itself has a mass of approximately 13 t so that a load weight of the load suspension means of approximately 17 t results together with the load hook. The spreader is set on the container for the raising of a container at the time 104. The then currently measured load weight hereby drops greatly downward since the container supports at least a part of the weight of the spreader. On the following raising of the container, the load weight then increases to a value of approximately 33 t. The container is placed down again at the target location. The plurality of force peaks results from the container being raised and lowered again a plurality of times in order to be positioned exactly e.g. on a further container. The container is in this respect, for example, first lowered and then raised again at the time 105. The container is only finally placed down at the time 106. On the placing down, the load weight in this respect again falls below the weight of the suspension means since it is supported on the container. A similar image as in FIG. 3*b* also arises when a gripper which first lies on the bulk goods on the taking up of bulk goods is used as the load suspension apparatus.

Figure 4A:
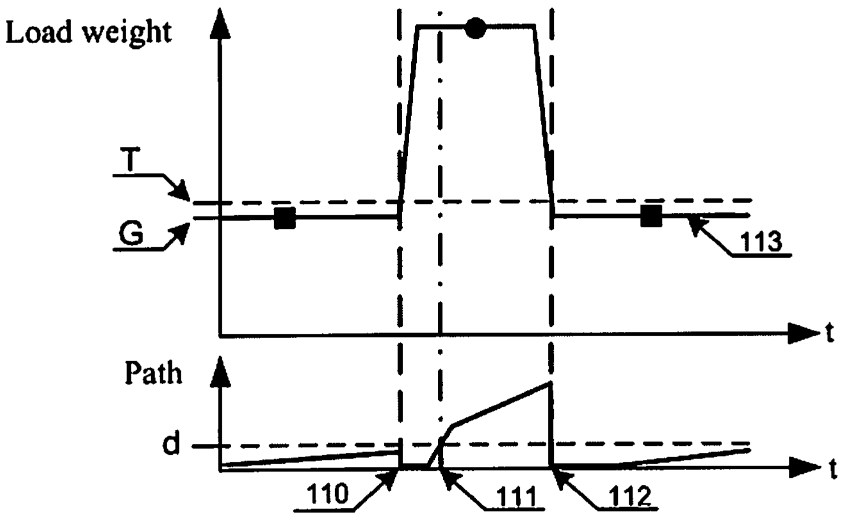
FIGS. 4*a* and 4*b* the load weight signal and the transverse distance of the load over a load cycle on the use of a load hook and of a spreader.
Figure 4B:
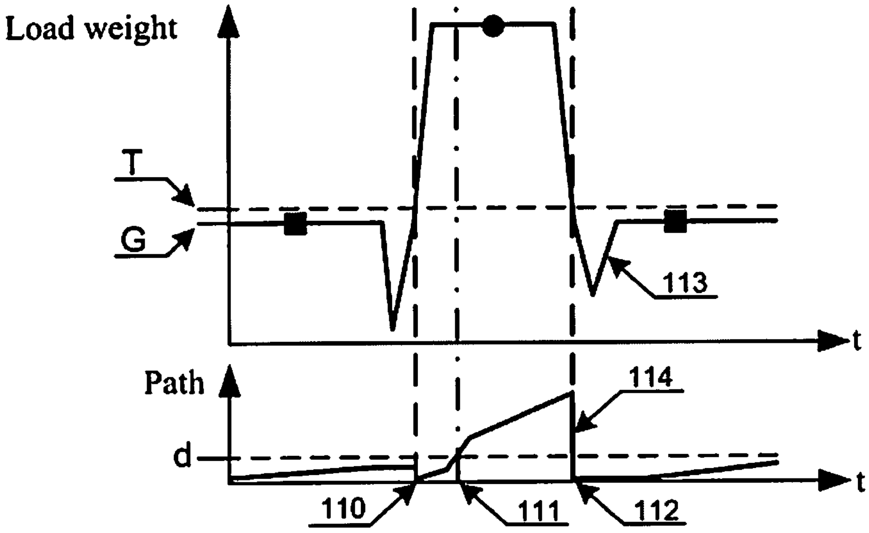

The load cycle detection in accordance with the invention for the two situations shown in FIGS. 3*a* and 3*b* is now shown schematically in FIGS. 4*a* and 4*b*. The load cycle detection in this respect first detects the weight G of the load suspension means while no load has yet been taken up. As soon as the then currently measured load weight 113 exceeds the detected weight G of the load suspension means by a value T, a positive load change is detected. This is the case in both cases at the time 110. On the detection of the load change, the position of the load or of the suspension means is stored. The positive load change at the time 110 is, however, only evaluated as the start of a new load cycle at the time 111. For this purpose, the then current position 114 of the load or of the load suspension means is compared with the load pick-up point. Only after the load or the load suspension means has been moved by a distance d in the horizontal with respect to the load pick-up point is the previous positive load change evaluated as the start of a new load cycle.

The end of the load cycle is recognized at the time 112 at which a negative load change takes place at which the then currently measured load weight 113 again falls below the limit value T above the weight G of the load suspension means.

Figure 5A:
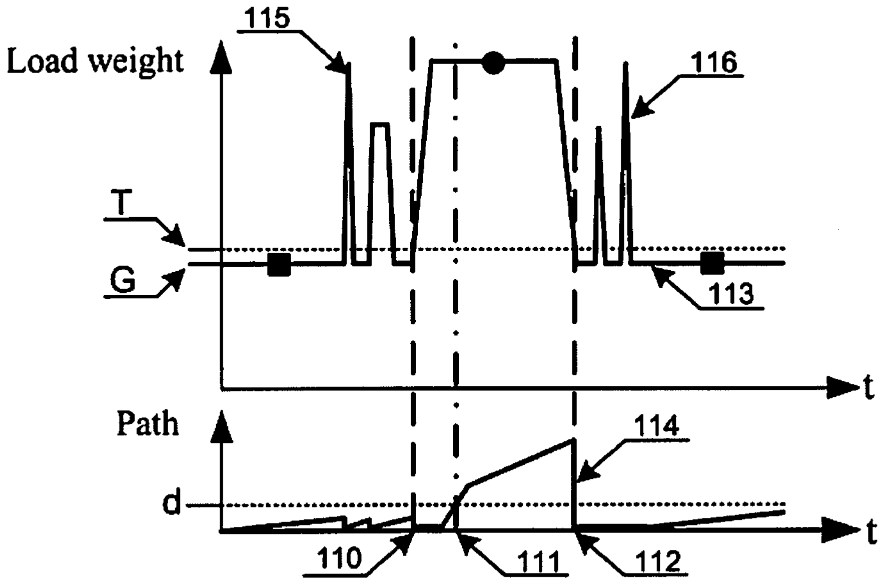
FIGS. 5*a* and 5*b* the load weight signal and the transverse distance of the load over a load cycle on the use of a load hook and of a spreader, wherein the load is moved up and down a plurality of times on being taken up and placed down.
Figure 5B:
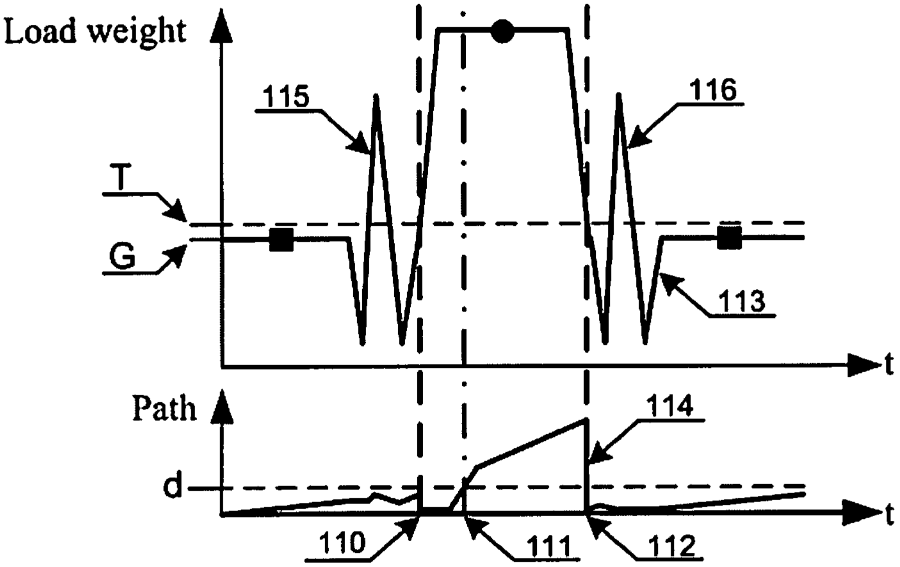

It can now be seen with reference to FIGS. 5*a* and 5*b* why this automatically generated trigger threshold for the horizontal or transverse movement away from the load pick-up point increases the precision of the load cycle detection and prevents the load change on the raising and lowering of the load from incorrectly being recognized as new load cycles.

In this respect, the load was first raised and then lowered again on the taking up of the load in FIGS. 5*a* and 5*b*. Load peaks 115 which exceed the value T above the weight G of the load suspension means hereby arise in the load weight signal 113.

In this respect, respective positive load changes are recognized and the then current position of the load is stored as the load pick-up point. As can, however, be seen from the position curve 114, the load is first only moved slightly in the horizontal after the first positive load change so that it does not cover the distance d from the stored load pick-up point. Since a negative load change takes place after the first positive load change without the load having exceeded the trigger threshold in the horizontal, this first load is not taken into any further account.

Only the positive load change on the repeated exceeding of the load threshold at the time 110 is evaluated as the start of an active load cycle since the load has covered the distance d from the load pick-up point stored in this respect at the time 111. The end of this active load cycle is then recognized at the time 112 when a negative load change takes place.

The load changes 116 which likewise occur on the lowering of the load are likewise not evaluated as the start of a new active load cycle since the load was not moved by the distance d up to the reaching of the next negative load change.

In the drawings, for the simpler representation of the position in the lower diagram, the respective transverse distance of the load is entered after the last (positive or negative) load change.

Figure 6:
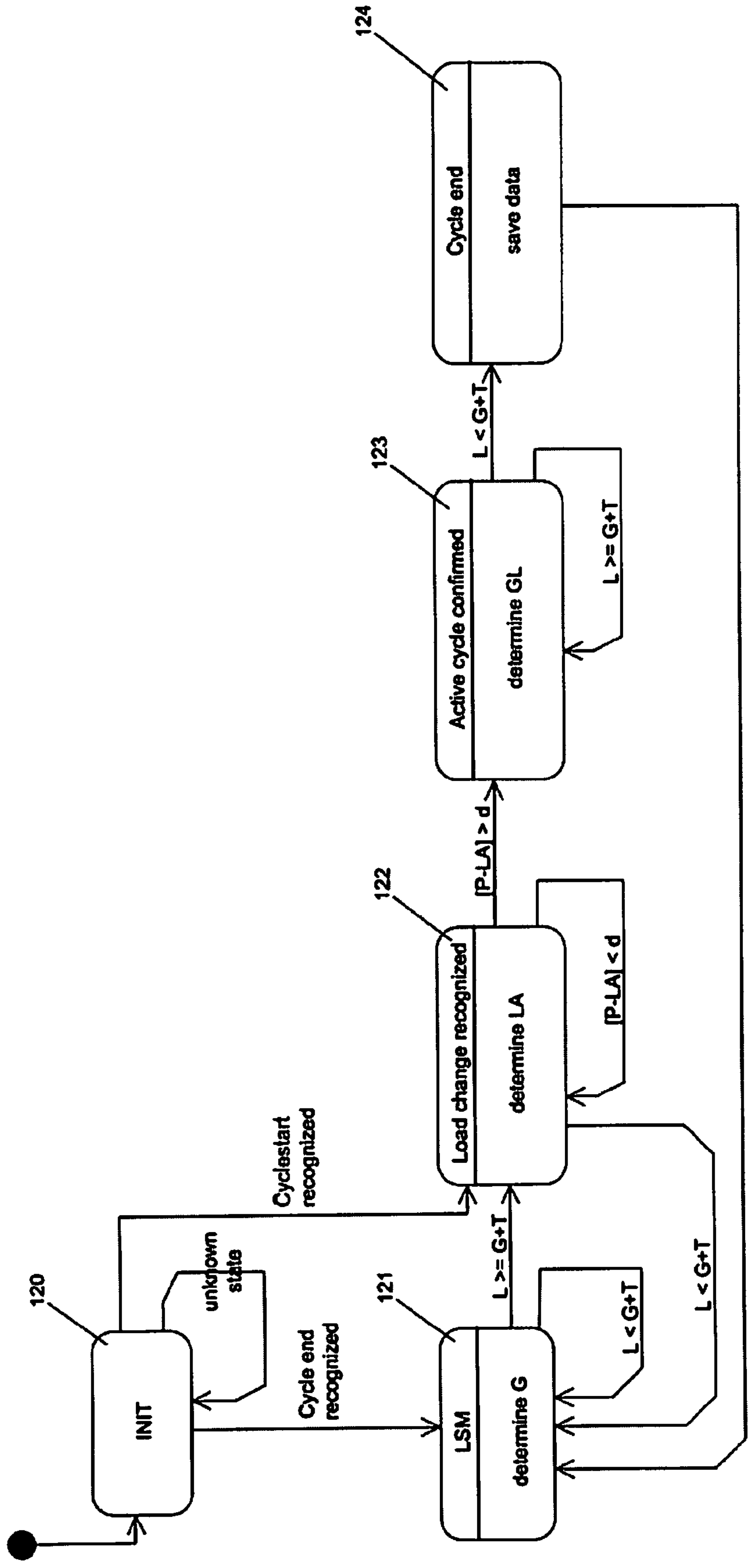
FIG. 6 a first embodiment of a state machine in accordance with the invention.

In FIG. 6, a state machine is now shown by which the cycle detection in accordance with the invention was realized. The state machine first has an initializing state 120 in which the system starts. Depending on whether a cycle end or a cycle start is recognized, the system then changes into the states 121 and 122.

The actual state machine for the load cycle detection is formed by the states 121 to 124.

In the state 121, the state machine assumes that no load is suspended at the hoist rope and thus the load weight corresponds to the weight G of the load suspension means (LSM). In this state, the load cycle detection determines the weight G of the load suspension means. In this respect, the weight G of the load suspension means is at least determined every time that the state machine changes from the cycle end 124 into the state 121 in which no load is suspended at the load suspension means. The weight G of the load suspension means can also be determined every time that a change is made into the state 121. A manual taring of the system is hereby no longer necessary. The system rather automatically detects the weight of the load suspension means.

The determination of the load weight G of the load suspension means can in this respect take place via a mean value filter. The mean value calculation in this respect advantageously only takes place over such time periods in which the then current load weight L is located in a specific range about the previously determined weight G of the load suspension means. Such values of the then currently measured load weight L are in particular not taken into account in the mean value calculation which are in a range G−T'. Otherwise, with load suspension means which generate load weight signals as shown in FIGS. 3*b* and 4*b*, too low a weight G of the load suspension means would be determined. The lower limit value T' can in this respect, for example, be selected as equal to the limit value T for the recognition of a positive load change.

The load change detection in this respect constantly monitors the then current load weight and compares it with the weight G of the load suspension means. As long as the then current load weight does not exceed the weight G by a value T, i.e. as long as no positive load change is detected, the state machine remains in the state 121.

If a positive load change is detected, the state machine switches into the state 122. In this state, a positive load change was recognized so that an active cycle is possibly present. On the change between the state 121 and the state 122, i.e. on the detection of a positive load change, the position of the load or of the load suspension means is simultaneously stored as the load pick-up point LA. The system now continuously compares the then current position P of the load or of the load suspension means with the stored load pick-up point LA and determines from this the distance of the load from the load pick-up point in the horizontal direction [P-LA]. As long as this transverse distance [P-LA] is smaller than the minimum distance d which is used as the trigger threshold, the finite-change machine remains in the state 122. In addition, the load weight L is continuously determined. If it falls below the value G+T, the finite-change machine changes back into the state 121.

If, in contrast, the transverse distance [P-LA] exceeds the minimum distance d while the state machine is in the state 122, the finite-change machine changes into the state 123. It is hereby confirmed that an active cycle is present. The last occurring positive load change is thus recognized as the start of an active cycle. While the finite-change machine is in the state 123, the weight GL of the load is determined. For this purpose, the weight G of the load suspension means is deducted from the then currently measured load weight L. In this respect, a mean value calculation can be provided via a mean value filter with respect to the load weight L. Provision can moreover be made that the mean value filter is updated or restarted on a sharp increase in the load weight.

The state machine in this respect monitors the then current load weight L and constantly compares it with the weight G of the load suspension means. As soon as the then current load weight again falls below the value G+T, the state machine changes from the state 123 into the state 124 so that the end of the active cycle is detected. In the state 124, the data for the just ended active cycle are saved. In this respect, it can in particular be the weight GL of the load as well as further data on the just ended active cycle. For example, the load pick-up point and the time of the load pick up can be stored in this respect. In addition, the position and, optionally, the time at which the cycle end was recognized can be stored. Furthermore or alternatively, the duration of the cycle, the distance covered during the cycle, maximum and minimal values of the load weight and similar can be stored.

After the storing of the data, the state machine changes back from the state 124 into the state 121 again which corresponds to a state without a suspended load. The weight G of the load suspension means is now in turn determined.

Figure 7:
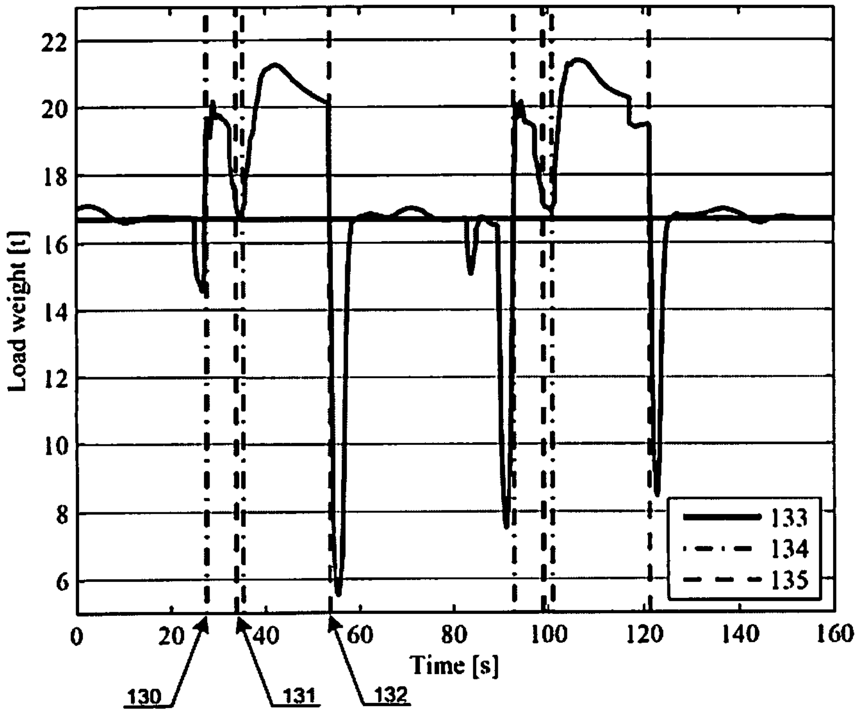
FIG. 7 the load weight signal over a load cycle in which a dynamic disturbance occurs.

A problem with the just represented load cycle detection can be found in load changes due to dynamic movements of the load which take place while the load is suspended at the crane rope and is being moved. Such load changes can arise, for example, due to oscillations of the load. FIG. 7 in this respect shows an example for such a load weight curve. The load weight is in this respect drawn as the solid line 133. Positive load changes are drawn as solid vertical lines 134; negative load changes as dotted lines 135. A positive load change is in this respect recognized at the time 130. The load is thereupon moved transversely so that this positive load change is recognized as the start of an active load cycle. At the time 131, the load weight oscillates very strongly due to dynamic processes so that it briefly falls below the limit value G+T. A negative load change is therefore first recognized here and a positive load change immediately afterward.

This has the result in the state machine shown in FIG. 6 that a cycle end is recognized on the negative load change. Since the load is moved further in the transverse direction after the immediately following positive load change, this positive load change is also detected as the start of a new active load cycle. The state machine shown in FIG. 6 would therefore erroneously evaluate the load cycle shown in FIG. 7 as two separate load cycles due to the dynamic load changes at the time 131.

To avoid such errors, a further criterion can be used to detect the start and the end of an active load cycle. For this purpose, not only the then current position of the load or of the load suspension means is stored on the detection of a positive load change, but the speed of the load or of the load suspension means is also determined in the horizontal direction. Only when this speed v is below a specific limit value r can this positive load change correspond to the start of a new active load cycle. If, in contrast, the speed v is above the limit value r, the system concludes that a dynamic problem was present and the previous active load cycle is continued.

Figure 8:
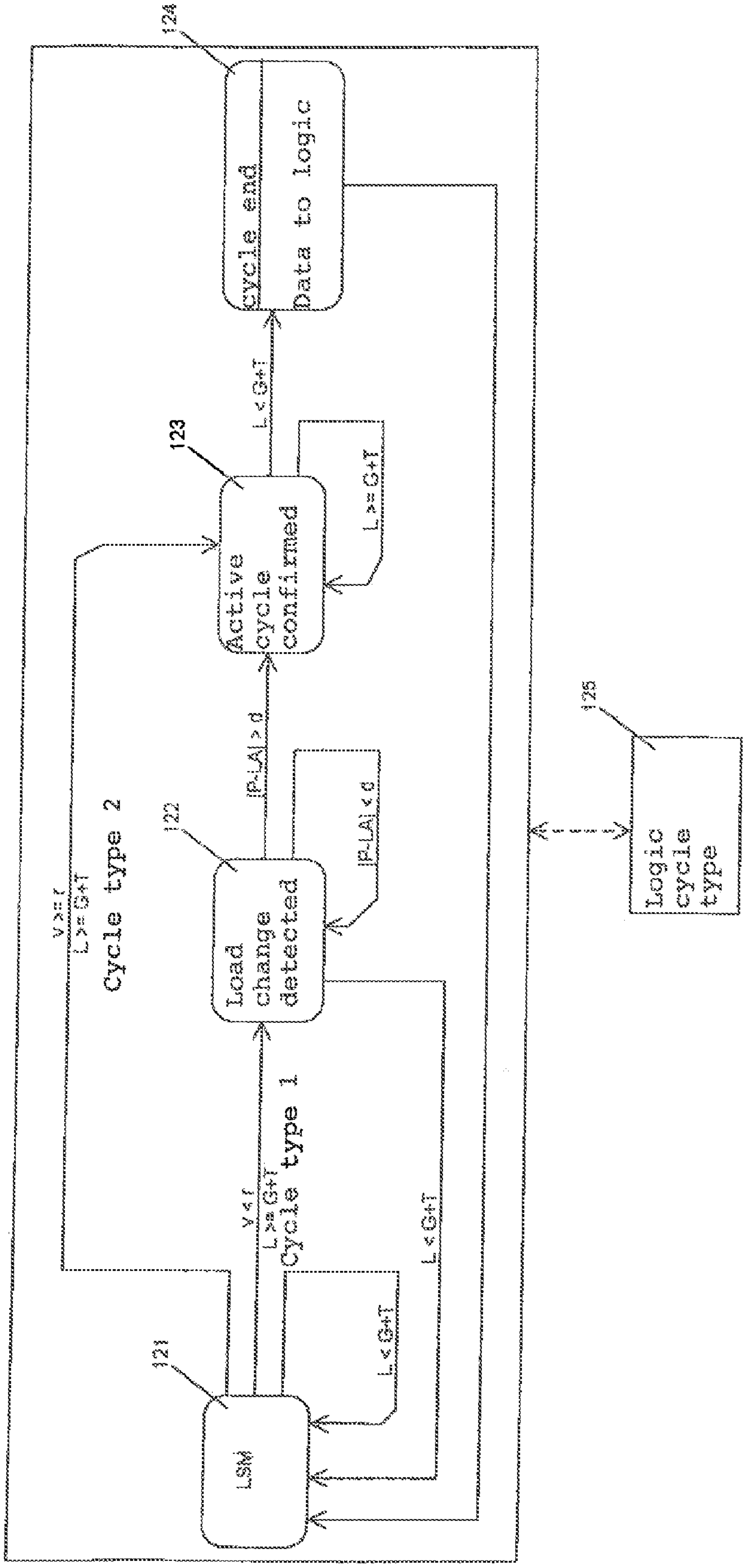
FIG. 8 a second embodiment of a state machine in accordance with the invention.

An expansion of the state machine shown in FIG. 6 which takes account of this additional criterion is shown in FIG. 8 in this respect. The states 121 to 124 in this respect essentially work as was shown with respect to FIG. 6. The additional criterion now comes into effect when a positive load change was recognized in the state 121. If a transverse speed v smaller than r is determined during the positive load change, the state machine changes as before into the state 122. A cycle type 1 is stored in this respect.

If, in contrast, the state machine determines a transverse speed v which is larger than the limit value r on a positive load change in the state 121, the state machine changes directly into the state 123. A cycle type 2 is furthermore stored.

It can be determined by the storage of the respective cycle type whether the start of a new active load cycle is actually present here or whether an already active cycle is only being continued. For this purpose, the state 124, i.e. the state switched on a negative load change from the state 123, forwards its data to a logic 125. This logic 125 now waits to see what sort of cycle type is stored on the next change from the state 121. If a cycle type 1 is stored, the logic evaluates the data at the preceding cycle as the data of a completed active cycle. If, in contrast, a cycle type 2 is stored, the logic 125 evaluates the data of the last cycle only as a part cycle of the then active cycle.

The logic 125 is necessary since no criterion with respect to the speed of the load suspension means or of the load should be provided with regard to the cycle end 124. It is namely by all means possible that the load suspension means is moved further on the unloading of the load, e.g. when bulk goods are distributed via a gripper over a longer distance. The state machine therefore always switches from the state 123, i.e. from an active cycle, to the cycle end when the load falls below the threshold value G+T. The logic 125 then determines on the basis of the next transition from the state 121 either into the state 122 or directly into the state 123 whether it was actually the end of an active load cycle or whether the last active load cycle is only being continued.

It had previously been assumed that the state machine is first aware when it is in the state 121 and can thus automatically determine the weight G of the load suspension means. It should now be shown in the following how an embodiment of a system in accordance with the invention works for the automatic detection of a exchange of the load suspension means. The simplest case in which an exchange is made from a heavier load suspension means to a lighter load suspension means will now be presented in more detail with reference to FIG. 9.

Figure 9:
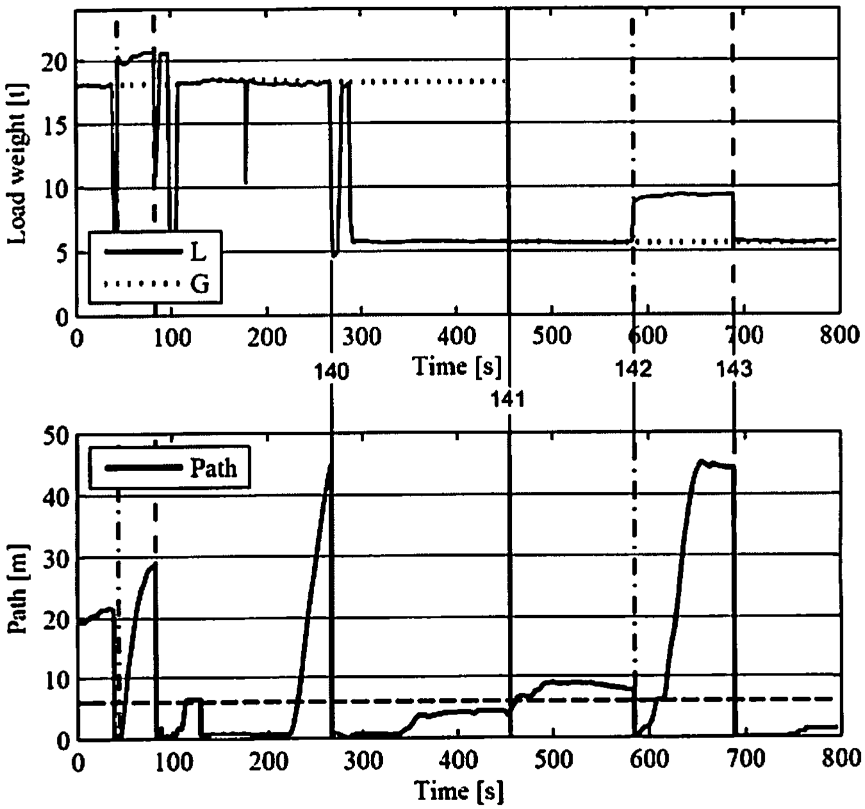
FIG. 9 the load weight signal and the transverse distance on a change to a lighter load suspension means.

The load weight signal L and the weight G which the system assumes are entered at the top in FIG. 9. The transverse distance which the load suspension means or the load moves after each load change is entered at the bottom. The exchange of the load suspension means in this respect takes place at the time 140. Up to this time, the weight G which the system has determined for the load suspension means therefore corresponds to the then currently measured load weight L.

The system now determines a negative load change in the state 121 in which no load is suspended at the load suspension means. This negative load change from the state 121 is detected in this respect when the then current load weight L falls below the previously detected weight G of the load suspension means by a value T'. The limit value T' can in this respect be selected just as large as the limit value T, e.g. 0.8 t. At this time, the mean value calculation for the weight G of the load suspension means is suspended so that it initially constantly remains at the last determined value.

The determination whether an exchange of the load suspension means has actually taken place now or whether it was only e.g. placed down, now in turn takes place via the observation of the transverse distance which the load suspension means has moved since the detection of the negative load change. For this purpose, on the detection of a negative load change from the state 121, the position of the load suspension means is stored as the load suspension means placement position. The system now checks whether the load suspension means covers a distance of more than d' in the horizontal direction with respect to the load suspension means placement position. If the load suspension means covers such a distance without a positive load change having taken place in the meantime, the system evaluates this as an exchange of the load suspension means and updates the weight G of the load suspension means accordingly to the then currently measured load weight L.

This takes place in FIG. 9 at the time 141 at which the transverse distance shown at the bottom from the location of the negative load change at the time 140 is larger than the limit value d'. A value larger than d, e.g. twice d, is in this respect advantageously selected as the limit value d'. From the time 141, the state machine now works with the new, lower weight G of the load suspension means. Accordingly, at the time 142, a positive load change is recognized since the then current load weight exceeds the now updated value G+T. This new cycle is then confirmed as an active cycle as normal on the basis of the transverse movement, with the end of this active cycle 143 being recognized on the basis of the negative load change.

If the then current load weight signal, in contrast, increased above G−T' again after the negative load change in the state 121 without a transverse movement larger than d' having taken place, the system would have rejected the negative load change and would have continued to work with the previously detected weight G of the load suspension means.

This automatic recognition of the change to a lighter load suspension means can in this respect take place by an expansion of the state machine shown in FIG. 8. The expansion of the state machine is in this respect shown in FIG. 10, with only the state 121 from FIG. 8 also being shown for reasons of clarity. In this respect, the weight G is determined by mean value calculation in the state 121. In this respect, however, only those time periods are taken into account at which the then current load weight L does not fall below a specific limit value T' below the previously determined load weight G, i.e. as long as L is larger than G−T'.

If the then currently measured load weight, in contrast, falls below G−T', a negative load change from the state 121 is determined. The system then changes into the state 126. On this transition, the position of the load suspension means at the time of the negative load change is determined as the load suspension means placement point LMA. In the state 126, it is now monitored whether the load suspension means has been moved transversely over a distance of more than d' with respect to the load suspension means placement point LMA.

As long as the distance of the load suspension means to the load suspension means placement point [P-LMA] is smaller than d', the system remains in the state 126. In this respect, monitoring is continued as to whether the then current load weight again exceeds the threshold G−T'. If the load weight L again exceeds G−T', a positive load change is determined and the state machine again switches into the state 121. The previously determined weight G of the load suspension means then remains and the mean value calculation is continued.

If, in contrast, the system recognizes in the state 126 that the load suspension means has been moved away from the load suspension means placement point by a distance d', it changes into the state 127 and thus confirms the exchange to a lighter load suspension means. The weight G of the load suspension means is thereupon updated to the lower value now present. The system then changes again into the state 121 and continues with the now updated weight G of the load suspension means.

Figure 10:
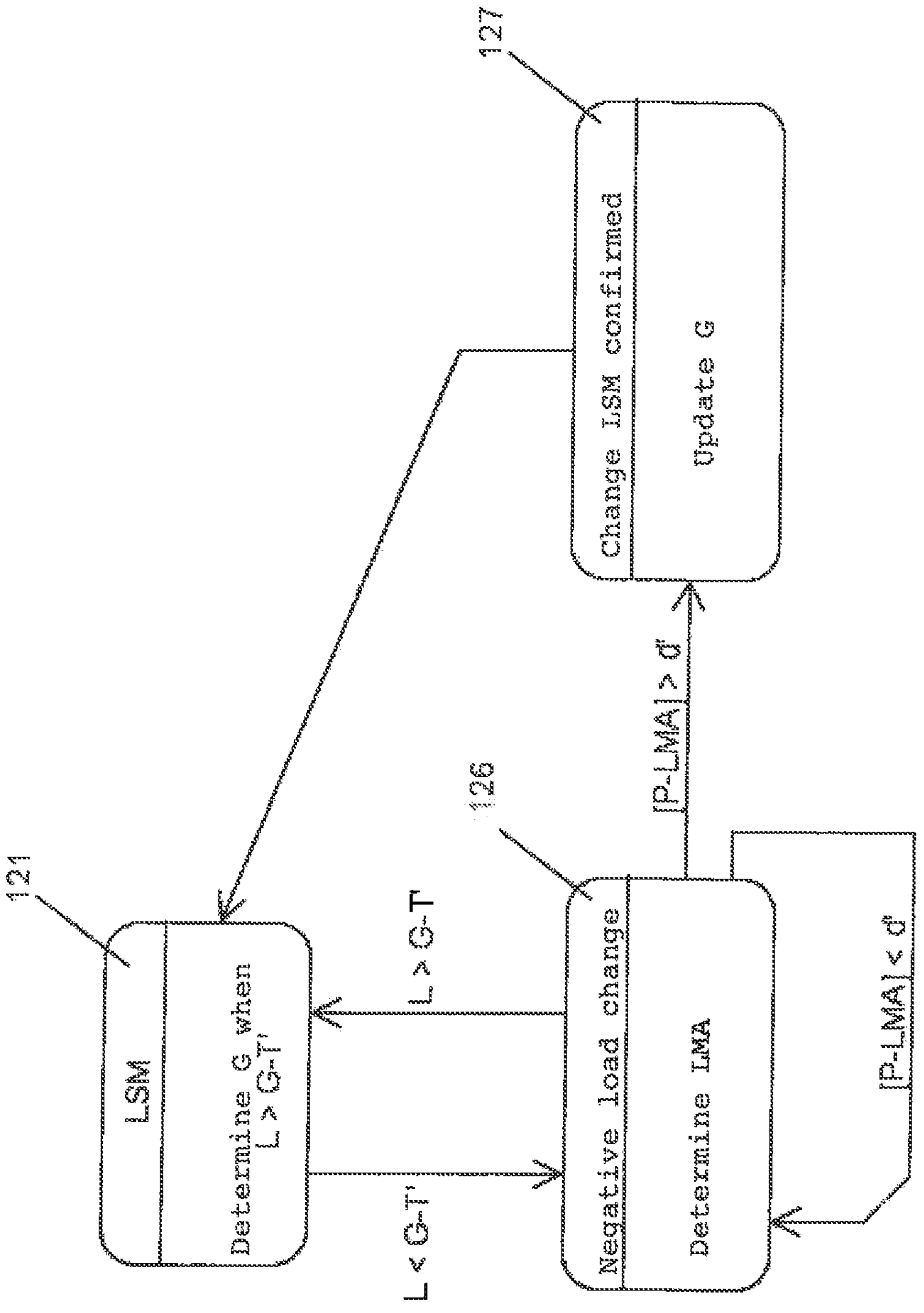
FIG. 10 an expansion of a state machine in accordance with the first or the second embodiments.

The expansion of the state machine shown in FIG. 10, however, only allows the automatic detection of an exchange to a lighter load suspension means.

Figure 11A:
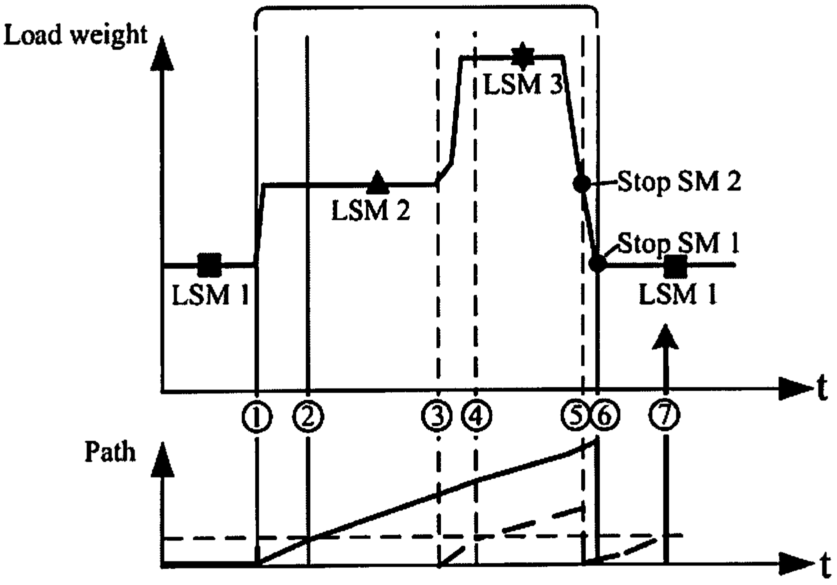
FIGS. 11*a* and 11*b* the load weight signal and the transverse distance on a load increase during the active cycle and on a change to a heavier load suspension means.

The basic problems with an exchange to a heavier load suspension means will be explained in more detail in this respect with reference to FIGS. 11*a* and 11*b*. A sequence is shown in FIG. 11*a* at which a load is picked up at the time 1. The load is, however, for example, still raised partly for some time so that the load weight increases considerably again at the time 3. The load is then placed down again at the time 6.

Figure 11B:
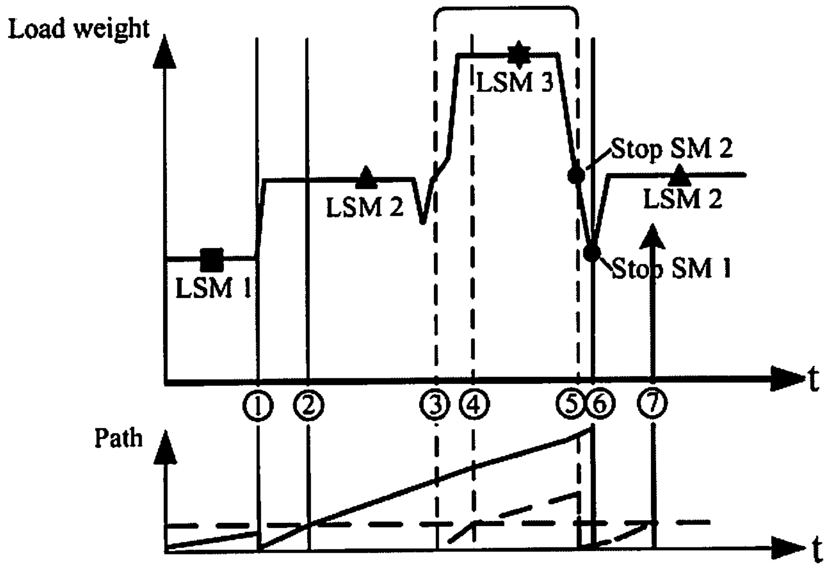

In FIG. 11*b*, in contrast, an exchange from a first load suspension means to a second, heavier load suspension means takes place at the time 1. At the time 3, a load is then raised with the second load suspension means. This is placed down again at the time 5, with the load suspension means being briefly supported on the load and with the then currently measured load value thus continuing to decrease.

It is therefore not possible to distinguish between the stepwise increase in the load weight taking place in FIG. 11*a* and the change in the load suspension means shown in FIG. 11*b* up to the time 6 since the course of the load weight signal is substantially identical. To nevertheless be able to distinguish the two situations from one another and to reliably detect an exchange to a heavier load suspension means, in accordance with the invention a plurality of state machines running in parallel are used. The individual state machines in this respect each work as shown in FIG. 8 or FIG. 10.

Figure 12:
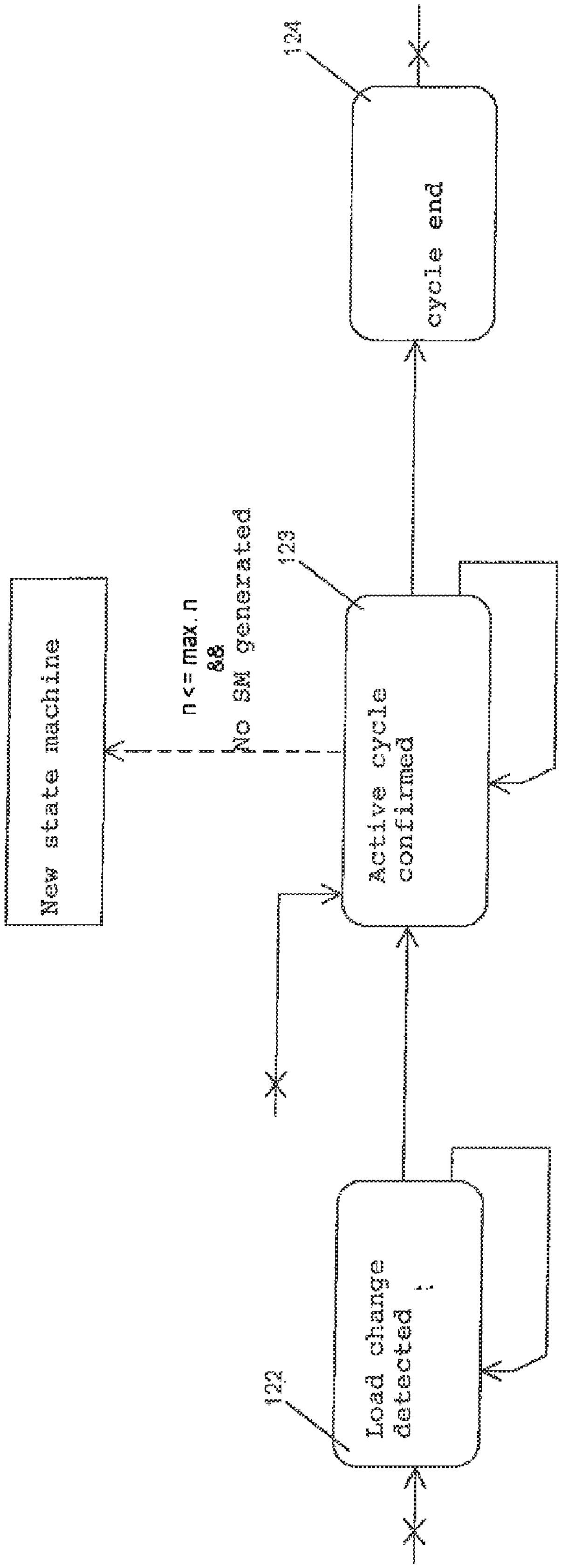
FIG. 12 an expansion of the state machine in accordance with the invention for the detection of changes of the load suspension means.

As shown in FIG. 12, a new state machine is always generated when switching takes place from the state 122 into the state 123 and an active load cycle is confirmed after the recognition of a positive load change. There can however be a maximum number $n_{max}$ of state-machines which are allowed to run in parallel. A new state machine is therefore started in each case in FIGS. 11*a* and 11*b* at the time 2 at which the active load cycle is confirmed. The new state machine in this respect in turn starts in the state 121 and therefore determines the higher load weight which is measured at 1 after the positive load change as the weight G of the load suspension means. At the time 3, the second state machine detects a positive load change which is in each case confirmed at the time 4. A third state machine is thereupon started which in turn starts in the state 121 and fixes the correspondingly higher load weight as the weight G of the load suspension means.

At the time 5, the second state machine SM2 now detects the end of the active cycle and changes into the state 124. The system is, however, initially not aware whether this actually corresponds to the end of the actually present load cycle. The system therefore waits a specific time period k after the first state machine detects the end of an active cycle. If no further state machine reports the end of an active load cycle within this time period k, which can e.g. amount to 2.5 s, the system assumes that the state machine which has reported the end of the load cycle corresponds to the actually present load cycle. All other state machines can thereupon be deleted.

In the present case, in contrast, the first state machine SM1 likewise reports the end of its active load cycle within the time period k. It can initially therefore not be determined which of the two state machines is reporting the actual state of the system.

The position of the load suspension means or of the load is therefore determined at the time at which an end of an active load cycle is first indicated. After the load suspension means was moved by the distance d" with respect to this position in the transverse direction at the time 7, a decision can be made as to which state machine reports the actual state. This is done by a comparison of the then currently measured load weight with the weight G of the load suspension means detected by the respective state machine.

If the load suspension means was therefore moved by a distance d" after recognition of the first cycle end, the system determines the difference between the then currently measured load weight L and the values G for the weight of the load suspension means of the individual state machines which have detected the end of a cycle. The state machine at which this difference is lowest is then evaluated as that state machine which corresponds to the actual state.

In the case of FIG. 11*a*, this is the first state machine SM1; in the case of FIG. 11*b*, the second state machine SM2.

Provision is furthermore made that whenever a first state machine corrects the weight G of the load suspension means to a lower value which corresponds to the weight G of another state machine, the system recognizes that this first state machine has not identified the real situation. This state machine is then deleted. Two values G for the load weight in this respect correspond if their difference is e.g. not larger than T.

Figure 13:
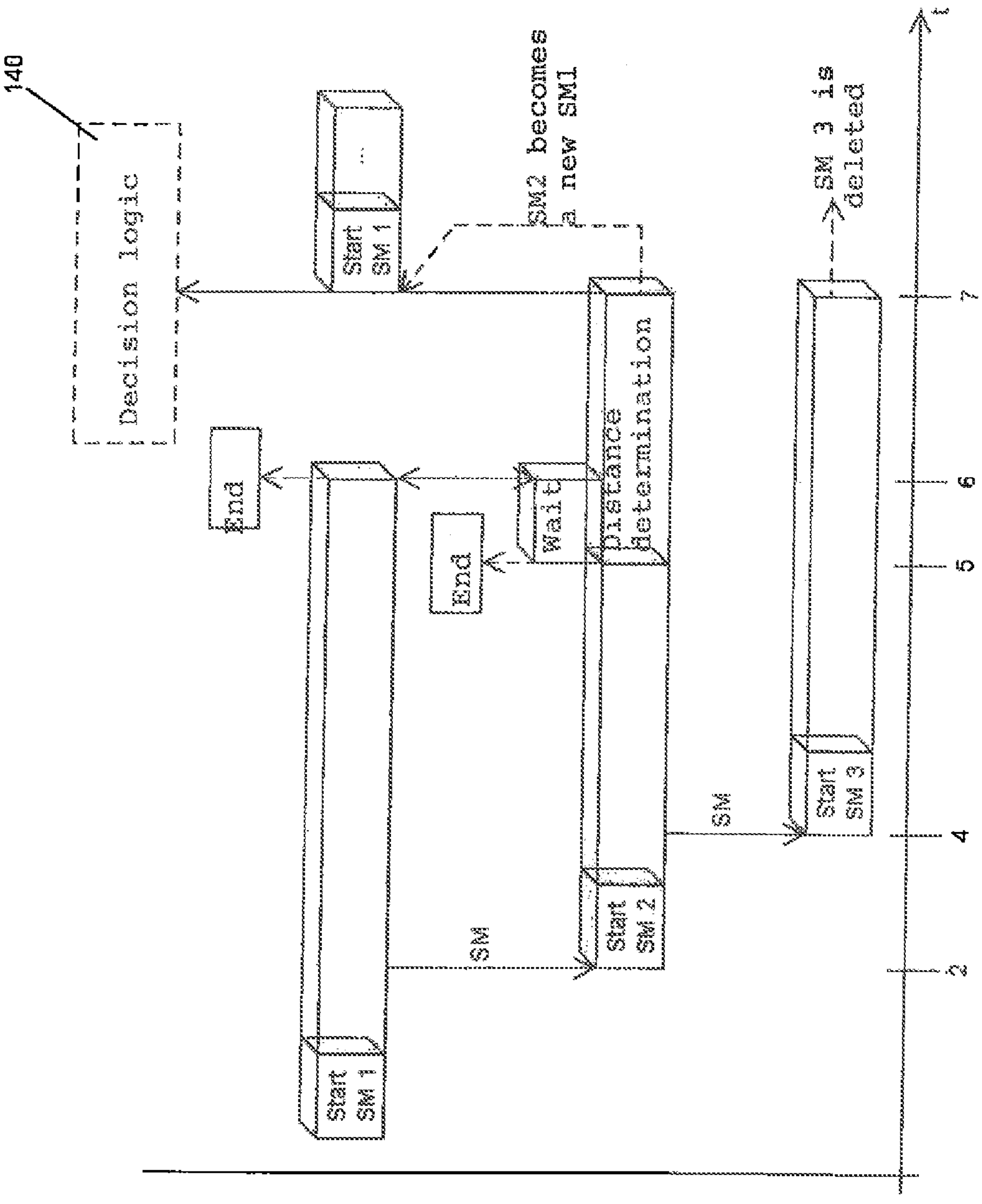
FIG. 13 an overview of the decision logic for the detection of changes of the load suspension means.

The procedure in the detection of an exchange to a heavier load suspension means will now be explained in more detail again with reference to FIG. 13 which shows the situation in FIG. 11*b*. At the time 5, at which the state machine SM2 indicates the end of its active cycle, a timer is first started and the position of the load suspension means at the time 5 is simultaneously determined. Since the first state machine 1 also signals the end of its active cycle within the time period k, a decision can only take place after the system has moved a distance d". The distance d" can in this respect correspond to the distance d. In this respect, the distance d" can be smaller than the distance d'. If the load suspension means has moved the distance of the threshold d" since the signaling of the first end of an active load cycle, the decision logic 140 decides which of the state machines is representing the actual state.

In this respect, the state machine is selected whose value G for the load weight of the load suspension means is closer to the then currently measured load weight L. In the case of FIG. 11*b*, this is the state machine SM2. It is now continued to be operated as the only state machine whereas all other state machines are deleted.

In the case of the development in FIG. 11*a*, in contrast, the value G of the first state machine SM1 would be closer to the then currently measured load weight at the time 7 so that the decision logics 140 would recognize the first state machine as the state machine which reports the actual state and would only continue to operate it.

The present invention thus makes it possible to automatically recognize an exchange of the load suspension means without sensors being necessary at the load suspension means for this purpose. The recognition rather takes place solely on the basis of the signal of the lifting force measurement apparatus as well as on the basis of the movements of the transfer machine. The changing weight of the load suspension means can hereby automatically be determined whenever the load suspension means are exchanged.

The cycle recognition in accordance with the invention further enables an extremely reliable and exact detection of the load cycles. The data stored by the cycle recognition in accordance with the invention in this respect allow a variety of functions.

The invention claimed is:

1. A system for the automatic detection of load cycles of a machine for the transferring of loads, wherein the machine includes a lifting apparatus for the raising of the load and a transport apparatus for the horizontal movement of the load, comprising:

- a load change detection for the automatic detection of a load change at least on the basis of the output signals of a lifting force measurement apparatus;
- a load position detection which detects the position of the load in at least horizontal direction; and
- a load cycle detection for the automatic detection of a load cycle, wherein the load cycle detection takes place at least on the basis of the output signals of the load change detection and of the load position detection, wherein
- the load cycle detection detects the position of the load as the load pick-up point when a positive load change was detected; and
- evaluates the positive load change as the start of a new load cycle on the basis of a query as to whether the load has been moved a predetermined distance from the load pick-up point in the horizontal.

2. A system in accordance with claim 1, comprising a load speed detection which detects the speed of the load at least in a horizontal direction, wherein the load cycle detection furthermore takes place on the basis of the output signals of the load speed detection, wherein the load cycle detection advantageously evaluates a positive load change as the start of a new load cycle on the basis of a query as to whether the load speed has not exceeded a predetermined value during the positive load change.

3. A system in accordance with claim 1, wherein the load cycle detection determines the end of an active load cycle on the basis of a query whether a negative load change has taken place.

4. A system in accordance with claim 1, wherein the load cycle detection takes place on the basis of a situation recognition system which has at least the following states: No load; positive load change recognized; active load cycle confirmed.

5. A system in accordance with claim 1, wherein the load cycle detection detects the load weight on the basis of the output signals of the lifting force measurement device, in particular by a mean value formation over the active load cycle or over a part range of the active load cycle.

6. A system in accordance with claim 1, comprising a load suspension means detection unit which automatically detects the weight of the load suspension means.

7. A system for the automatic detection of exchanges of the load suspension means in a machine for the transferring of loads, wherein the machine includes a lifting apparatus for the raising of the load, comprising:

a lifting force measurement apparatus for the measurement of the lifting force; and a load suspension means detection unit which automatically recognizes an exchange of the load suspension means at least on the basis of the output signals of the lifting force measuring apparatus.

8. A system in accordance with claim 7, comprising a position detection which detects the position of the load suspension means in at least a horizontal direction, wherein the load suspension means detection unit automatically recognizes a change of the load suspension means at least on the basis of the output signals of the lifting force measurement apparatus and on the basis of the position detection.

9. A system in accordance with claim 7, wherein the load suspension means detection takes place on the basis of a load cycle detection, the load suspension means detection advantageously detects the position of the load suspension means when a negative load change has occurred, while no active load cycle is present, wherein the negative load change is evaluated as a change to a lighter load suspension means on the basis of a query as to whether the load suspension means was moved a predetermined distance from the stored position in the horizontal after the negative load change.

10. A system in accordance with claim 7, wherein the load suspension means detection unit detects an exchange of the load suspension means on the basis of a plurality of discrete state machines running in parallel whose states are checked by a higher-ranking control logic.

11. A system in accordance with claim 7, wherein the load cycle detection stores the load cycle data of every detected load cycle in a database, wherein the database enables a later evaluation of the data.

12. A system in accordance with claim 11, wherein the load cycle data include one or more of the following data: Load weight, load cycle duration, start and stop position, start and stop time, weight of the load suspension means, minimal and maximum values of the load during the load cycle, travel distance, characteristics of the machine or of the drives of the machine.

13. A system in accordance with claim 11, wherein the evaluation of the data includes a determination of one or more of the following data: Energy/fuel consumption, total weight of the transferred load, average transfer performance, power/performance indices.

14. A transfer machine, comprising a system for the automatic detection of load cycles in accordance with claim 1.

15. A method for the operation of a system for the automatic detection of load cycles of a machine for the transferring of loads, wherein the machine includes a lifting apparatus for the raising of the load and a transport apparatus for the horizontal movement of the load, comprising the steps of:

automatically detecting of a load change by a load change detection at least on the basis of the output signals of a lifting force measurement apparatus;

detecting the position of the load in at least horizontal direction by a load position detection; and automatically detecting of a load cycle by a load cycle detection, wherein the load cycle detection takes place at least on the basis of the output signals of the load change detection and of the load position detection, wherein the load cycle detection detects the position of the load as the load pick-up point when a positive load change was detected; and evaluates the positive load change as the start of a new load cycle on the basis of a query as to whether the load has been moved a predetermined distance from the load pick-up point in the horizontal.

16. A transfer machine, comprising a system for the automatic detection of load cycles, comprising:

a system for the automatic detection of exchanges of the load suspension means in a machine for the transferring of loads, wherein the machine includes a lifting apparatus for the raising of the load, comprising:

a lifting force measurement apparatus for the measurement of the lifting force; and a load suspension means detection unit which automatically recognizes an exchange of the load suspension means at least on the basis of the output signals of the lifting force measuring apparatus.

17. A method for the operation of a system for the automatic detection of exchanges of the load suspension means in a machine for the transferring of loads, wherein the machine includes a lifting apparatus for the raising of the load, comprising the steps of:

measuring a lifting force by a lifting force measurement apparatus; and automatically detecting by a load suspension means detection unit an exchange of the load suspension means at least on the basis of the output signals of the lifting force measuring apparatus.

18. A system in accordance with claim 1, wherein the load cycle detection stores the load cycle data of every detected load cycle in a database, wherein the database enables a later evaluation of the data.

19. A system in accordance with claim 18, wherein the load cycle data include one or more of the following data: Load weight, load cycle duration, start and stop position, start and stop time, weight of the load suspension means, minimal and maximum values of the load during the load cycle, travel distance, characteristics of the machine or of the drives of the machine.

20. A system in accordance with claim 18, wherein the evaluation of the data includes a determination of one or more of the following data: Energy/fuel consumption, total weight of the transferred load, average transfer performance, power/performance indices.

* * * * *